Figure 1:
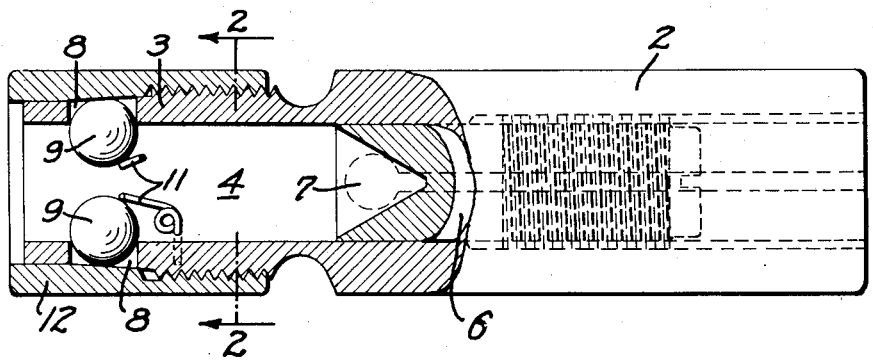

Aug. 8, 1933.   E. A. NORMAND   1,921,695
CHUCK
Filed May 31, 1932

INVENTOR.
ERNEST A. NORMAND
BY
HIS ATTORNEY

Patented Aug. 8, 1933

1,921,695

UNITED STATES PATENT OFFICE 1,921,695

CHUCK

Ernest A. Normand, San Francisco, Calif., assignor to Emile H. Normand, San Francisco, Calif.

Application May 31, 1932. Serial No. 614,486

1 Claim. (Cl. 279—75)

My invention relates to a chuck, and particularly to a chuck for gripping a fluted tool.

It is among the objects of my invention to provide a chuck having improved locking means for engaging the fluted shank of a tool, such as a twist drill.

Another object of my invention is to provide a chuck of the character described which will receive tools of different size.

A further object of my invention includes the provision, in a chuck of the character described, of means for accurately and automatically centering the tool.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claim.

Figure 2:
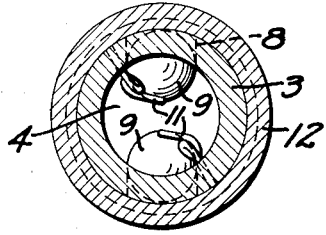

Referring to the drawing:

Figure 1 is a side view, partly in section and partly in elevation showing a chuck embodying the improvements of my invention; and Figure 2 is a transverse vertical sectional view of the same taken in a plane indicated by the line 2—2 of Figure 1.

In terms of broad inclusion, the chuck embodying my invention comprises a recessed holder for receiving the shank of a fluted tool. The holder is preferably provided with a conical seat at the base of the recess in which the end of the tool may center. A locking element is also provided, and is mounted on the holder to project into the recess for engaging a flute in the tool. Preferably a pair of the locking elements are provided and are oppositely disposed in the holder, and means are preferably provided for pressing the elements toward each other and into clamping engagement with the tool to lock the same and center it axially of the recess. Resilient means are also preferably provided for spreading the locking elements to hold the same normally outwardly of the recess. By this construction tools of different size, and having merely fluted shanks to be engaged with, are automatically centered and securely held. Means are also preferably provided in the chuck for selectively varying the length of tool projecting from the chuck.

In greater detail, the preferred form of chuck embodying my invention comprises a holder having a shank portion 2 and a head portion 3; the holder being preferably tubular in construction to provide a recess 4 for receiving the fluted end of a tool, such as a broken twist drill. The shank end of the holder is preferably slotted, and is threaded to receive a plug 6 having a conical seat 7 in which the end of the tool may center. The purpose of making the plug 6 adjustable is to provide means for varying the depth of the recess 4; it being understood that the length of tool projecting from the chuck may be varied by turning the adjusting plug 6. When the holder is clamped in a machine the plug is securely locked in the slotted shank portion 2 of the holder.

The head portion 3 of the holder is preferably cross drilled to provide a pair of oppositely disposed apertures 8 opening into the recess 4. A locking element, preferably in the nature of a ball 9, is seated in each of the apertures 8, and projects into the recess for engaging a flute in the tool. Resilient means are provided for spreading the balls to normally keep the central portion of the recess clear for the ready insertion of a tool. For this purpose a pair of springs 11 are preferably provided and are mounted on the holder in a position to lie in the flutes of the tool. These springs engage the balls and operate to urge them outwardly of the recess.

Means are also provided for adjusting the locking elements or balls 9 relative to the amount of their separation, so that the balls may be forced toward each other against the action of the springs 11 and into the clamping engagement with the tool for preventing the same from dropping out of the chuck. This adjusting means is preferably designed to move the balls 9 simultaneously and equally, so that the balls not only serve to lock and clamp the tool, but also function to center the tool axially of the holder.

To accomplish these results the chuck head 3 is preferably tapered, and a sleeve 12, having a tapered surface complementary to the tapered head, is threaded on the holder. This construction is best shown in Figure 1, and it will be noted that the sleeve 12 covers the apertures 7 and that the tapered surface thereof provides a backing against which the balls 9 are adapted to bear. By turning the sleeve 12 in one direction the locking balls are forced together to clamp and center the tool, and by turning the sleeve in the opposite direction the balls are allowed to separate to permit ready removal of the tool.

The spreading of the balls 9 and their varying engagement in the flutes of different sized tools adapts the chuck for receiving a convenient range of tool sizes. For example, I have designed a chuck in accordance with the teachings of my invention that will take twist drills ranging in size from ⅛ to ½ inch.

I claim:

A chuck for gripping a fluted tool comprising a recessed holder for receiving the tool and having an aperture opening into the recess, a ball seated in the aperture and projecting into the recess for engaging a flute in said tool, a spring mounted on the holder in a position to lie in a flute of the tool and bearing against said ball for urging the same outwardly of the recess, and means for moving the ball into the recess against the action of said spring.

ERNEST A. NORMAND.